United States Patent
Paliwal et al.

(10) Patent No.: US 9,384,005 B2
(45) Date of Patent: Jul. 5, 2016

(54) SYSTEMS AND METHODS FOR DYNAMIC CONFIGURATION OF CLIENT-SIDE DEVELOPMENT ENVIRONMENTS THROUGH USE OF APPLICATION SERVERS

(75) Inventors: Sandeep Paliwal, Karnataka (IN);
Ramchandra Kulkarni, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 975 days.

(21) Appl. No.: 12/548,531

(22) Filed: Aug. 27, 2009

(65) Prior Publication Data

US 2014/0289738 A1    Sep. 25, 2014

(51) Int. Cl.
*G06F 9/44* (2006.01)
*G06F 13/00* (2006.01)

(52) U.S. Cl.
CPC .. *G06F 9/44* (2013.01); *G06F 8/38* (2013.01); *G06F 13/00* (2013.01)

(58) Field of Classification Search
None
See application file for complete search history.

(56) References Cited

U.S. PATENT DOCUMENTS

| | | | | |
|---|---|---|---|---|
| 6,558,431 | B1 * | 5/2003 | Lynch et al. | 715/210 |
| 6,968,538 | B2 * | 11/2005 | Rust et al. | 717/108 |
| 6,978,461 | B2 * | 12/2005 | Shapiro et al. | 719/311 |
| 6,990,654 | B2 * | 1/2006 | Carroll, Jr. | 717/109 |
| 7,111,245 | B2 * | 9/2006 | Brockway | 715/764 |
| 2002/0130900 | A1 * | 9/2002 | Davis | 345/744 |
| 2002/0199031 | A1 * | 12/2002 | Rust et al. | 709/315 |
| 2003/0005181 | A1 * | 1/2003 | Bau et al. | 709/330 |
| 2003/0070006 | A1 * | 4/2003 | Nadler et al. | 709/330 |
| 2003/0135665 | A1 * | 7/2003 | Barker et al. | 709/328 |
| 2003/0158871 | A1 * | 8/2003 | Fomenko | 707/203 |
| 2003/0158918 | A1 * | 8/2003 | Hanis | 709/220 |
| 2003/0192027 | A1 * | 10/2003 | Porter | 717/100 |
| 2003/0193521 | A1 * | 10/2003 | Chen et al. | 345/762 |
| 2004/0003091 | A1 * | 1/2004 | Coulthard et al. | 709/227 |
| 2004/0003371 | A1 * | 1/2004 | Coulthard et al. | 717/101 |
| 2004/0158811 | A1 * | 8/2004 | Guthrie et al. | 717/103 |
| 2004/0193682 | A1 * | 9/2004 | Deboer et al. | 709/203 |
| 2004/0216052 | A1 * | 10/2004 | Methot | 715/705 |
| 2004/0268305 | A1 * | 12/2004 | Hogg et al. | 717/109 |
| 2005/0262480 | A1 * | 11/2005 | Pik et al. | 717/120 |
| 2005/0268280 | A1 * | 12/2005 | Fildebrandt | 717/113 |
| 2006/0015816 | A1 * | 1/2006 | Kuehner et al. | 715/744 |
| 2006/0064422 | A1 * | 3/2006 | Arthurs et al. | 707/10 |
| 2006/0277484 | A1 * | 12/2006 | Brockway | 715/764 |
| 2007/0011618 | A1 * | 1/2007 | Maron | 715/749 |
| 2007/0038978 | A1 * | 2/2007 | Meijer et al. | 717/106 |
| 2007/0277109 | A1 * | 11/2007 | Chen et al. | 715/733 |

OTHER PUBLICATIONS

"FAQ-What is a plug-in? From Eclipsepedia," Eclipse Wiki, 2004, available at http://wiki.eclipse.org/FAQ_What_is_a_plug-in%3F (last accessed Aug. 14, 2009).

(Continued)

*Primary Examiner* — Shih-Wei Kraft
(74) *Attorney, Agent, or Firm* — Kilpatrick Townsend & Stockton LLP

(57) ABSTRACT

A client-side integrated development environment (IDE) may rely on an application server for certain processing tasks, such as generating code or other output using server-side templates. The client-side IDE can itself be configured through use of the application server to handle events generated in the client-side IDE. This may allow developers to easily add and/or change IDE functionality without the need to be familiar with the IDE software architecture or programming language.

15 Claims, 5 Drawing Sheets

(56) References Cited

OTHER PUBLICATIONS

"FAQ-What are extensions and extension points? From Eclipsepedia," Eclipse Wiki, 2004, available at http://wiki.eclipse.org/FAQ_What_are_extensions_and_extension_points%3F (last accessed Aug. 14, 2009).

Northover et al., "SWT: The Standard Widget Toolkit," Jun. 28, 2004, available at http://my.safaribooksonline.com/9780321256638?portal=informit (last accessed Aug. 14, 2009).

* cited by examiner

SYSTEMS AND METHODS FOR DYNAMIC CONFIGURATION OF CLIENT-SIDE DEVELOPMENT ENVIRONMENTS THROUGH USE OF APPLICATION SERVERS

TECHNICAL FIELD

The disclosure below generally relates to application development, particularly extension of application development software through use of one or more servers.

BACKGROUND

An application server can rely on scripts or other code provided by a developer to configure the operation of the application server. For example, a code generation file may configure the application server to generate output to be interpreted by a web browser or other client-side component to provide an interface for interacting with a database, a shopping cart, or other functionality. Examples of application server technologies include, but are not limited to, ADOBE COLDFUSION®, available from Adobe Systems Incorporated of San Jose, Calif., ASP.NET, available from Microsoft Corporation of Redmond, Wash., and PHP, available via the Internet from the PHP Group at php.net.

Code for applications can be developed using an integrated development environment (IDE) that may include code editing and validation functionality, project management functions, and compiling and testing capabilities. An IDE is itself a software application and may be extensible by a skilled programmer, such as by writing and installing a plugin for a plugin-based IDE such as Eclipse, available via the Internet at eclipse.org.

SUMMARY

In accordance with one or more aspects of the present subject matter, a client-side integrated development environment (IDE) may rely on an application server for certain processing tasks, such as generating code or other output using server-side templates. The client-side IDE can itself be configured through use of the application server to handle events generated in the client-side IDE. This may allow developers to easily add and/or change IDE functionality without the need to be familiar with the IDE software architecture or programming language.

For example, a method can comprise accessing configuration data specifying functionality added to an integrated development environment (IDE) executing at a client device, the configuration data identifying an event and code generation file to invoke by providing a call an application server. The IDE can be monitored to determine if the event occurs, and if/when the event occurs, a call can be provided to one or more application servers specified in the configuration data to invoke the code generation file(s).

For example, the event may comprise receipt of user input via a custom user interface (UI) element defined in the configuration data, provided by the IDE, and mapped to an IDE component that provides the call to the application server. For instance, a contextual menu may be added to the IDE to invoke one or more server-side templates specified in code generation file(s).

Embodiments also include systems and computer-readable media comprising code for adding functionality to a client-side IDE based on code generation capabilities of a server. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
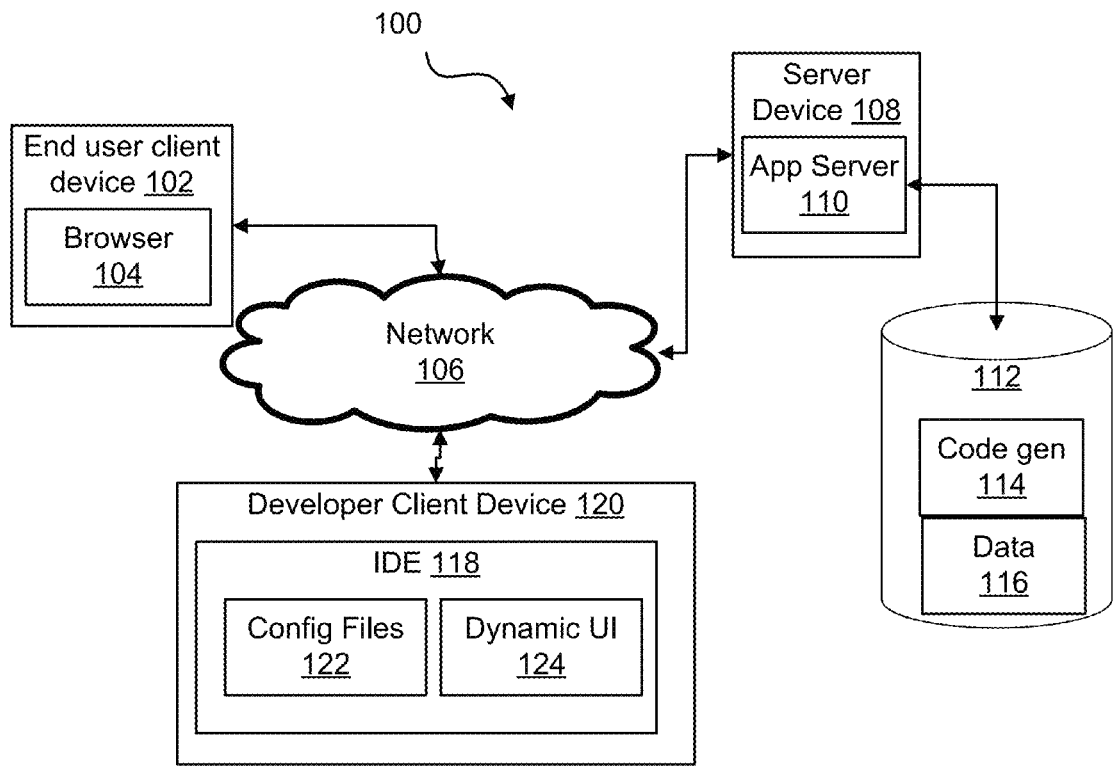
FIG. 1 is a block diagram illustrating an application server and client devices accessing functionality provided by the application server.

FIG. 1 is a block diagram illustrating an implementation 100 comprising client devices 102 and 120 accessing functionality provided by an application server computing device 108 via a network 106. Particularly, one or more end user clients 102 may utilize applications, such as a browser 104, to invoke functionality provided by server computing device 108 as configured by application server 110. Application server 110 accesses one or more data stores 112 to use code generation files to provide output, in this example, output formatted for use by browser 104 (e.g., dynamic HTML pages).

As a particular example, data 116 may comprise data from an SQL or other database queried by application server 110 based on one or more code generation files 114, with the code generation files configuring application server 110 to generate HTML or other output to provide a user-friendly display via browser 104. Output from application server 110 may comprise code such as HTML, source code such as C++ or another language, or even executable code such as one or more components of a rich internet application. Depending upon the configuration of application server 110, output may comprise documents, such as word processing documents or presentations.

Code generation files 114 which configure application server 110 typically must themselves be developed in some manner. For example, code generation files 114 may be specified using a language supported by application server 110 (e.g., CFML (Coldfusion Markup Language), PHP, and the like). An integrated development environment (IDE) 118 may be used for such purposes.

Developer client device 120 is an example of a computing system comprising a processor with access to a computer-readable medium embodying program components of IDE 118. In this example, the program components comprise configuration files 122 and dynamic components 124, which will be discussed further below. In accordance with one or more aspects of the present subject matter, IDE 118 is configured to parse configuration files 122 to identify one or more specified functions corresponding to dynamic components 124, which can be provided at least in part by calls to one or more application servers 110.

In some embodiments, this can allow developers to readily extend functionality of IDE 118 without the need of familiarity with the internal operations or code language for IDE 118. For example, IDE 118 may comprise a Java-based IDE such as the Eclipse framework but modified in accordance with the present subject matter. A developer familiar with writing code generation files for consumption by an application server (e.g., in the CFML format) may be unfamiliar with Java and disinclined to write and compile a Java plug-in for the IDE.

However, since IDE 118 supports invoking application-server based functionality in accordance with the present subject matter, the developer can write a suitable CFML file, deploy it for access by application server 110, and specify the file, needed parameters, and (optionally) UI elements in an XML or other configuration file 122. IDE 118 can include a series of dialogs or other interfaces accessed by the developer to point IDE 118 to the configuration file, thereby updating the functionality of IDE 118 without the need for recompiling or restarting the IDE. The added functionality may be referred to as an "extension" of IDE 118; in some embodiments, extensions can comprise a package of one or more XML configuration files and one or more code generation files to deploy to an application server.

Figure 2:
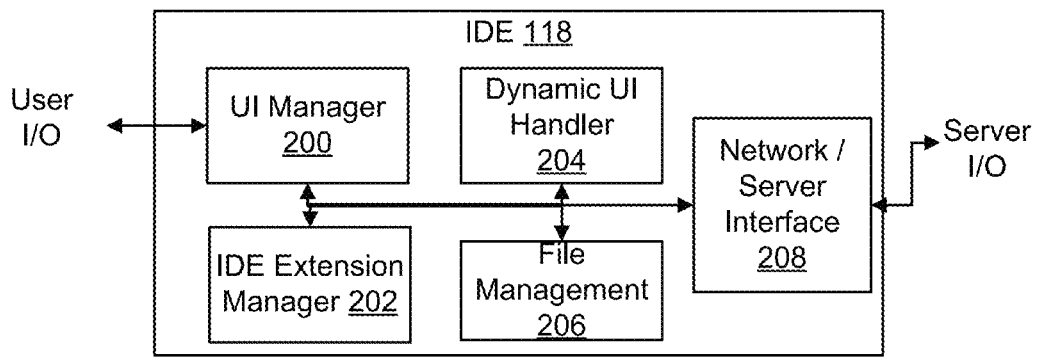
FIG. 2 is a block diagram illustrating components of an exemplary IDE.

FIG. 2 is a block diagram illustrating program components of an exemplary IDE 118 in closer detail. In this example, the program components include a user interface module 200 that configures the computing system to provide a user interface (UI) for receiving input and providing output from an integrated development environment (IDE). For example, the user interface can comprise one or more windows including an area for typing or otherwise inputting code and navigation panels for selecting code and project files for editing.

IDE 118 also comprises an IDE extension manager 202 that configures the computing system to access configuration data specifying a function to be added to the IDE and, based on the configuration data, monitor the IDE to determine if an event specified in the configuration data occurs. If/when the event occurs, manager 202 can provide a call to the application server to invoke a code generation file mapped to the event. For example, IDE extension manager 202 can comprise one or more application components that parse XML configuration data specifying a server address and particular files/commands to provide to the application server when a specified function is desired. In some embodiments, the XML data comprises one or more event handlers specifying a handler id, type, and filename. The event handlers can be mapped to event generators in the XML in order to correlate events to particular server commands.

The configuration data can also specify one or more UI elements for use in invoking the specified functions. Dynamic UI module 204 can configure the computing system to provide one or more such elements in one or more user interfaces. For example, if XML-based configuration data is used, a UI element such as a contextual menu can be defined as an event generator. A corresponding event handler can be specified in the XML so that receipt of input using the UI element invokes the filename associated with the handler.

In some embodiments, dynamic UI module 204 further configures the computing system to present one or more UI elements after or while the application server functionality has been invoked. For example, the application server may provide one or more UI elements for receiving parameters, such as form fields, in an HTML page. UI module 204 can include suitable code to present a browser or other view of the server-provided UI elements in the IDE. For instance, instead of a browser, UI module 204 can display a dialog box rendering an HTML or other interface generated by the application server.

In some embodiments, dynamic UI module 204 can support creation of UI elements by IDE 118 before, after, and/or while a call to the application server is made. For example, a complex workflow may rely upon one or more input parameters passed to the application server at various stages of the workflows. For instance, a user may be prompted for various inputs at different stages of code generation while a code generation file is executed by an application server. Dynamic UI module 204 can communicate with the application server to create suitable UI to facilitate this process. As an example, dialogs including text fields, password fields, file controls (e.g., to select directories, files, projects in the IDE workspace), check boxes, drop-down lists, and other elements, such as table controls (e.g., the Eclipse Standard Widget Toolkit) can be supported.

File management component 206 represents one or more functional elements of IDE 118 for tracking code and other files being edited or created. Additional IDE functionality may also be provided. For example, IDE 118 may include compilers/interpreters for one or more code language and/or other components for debugging and testing code.

IDE 118 also includes a computing interface module 208 that configures the computing system to initialize and maintain a suitable connection for accessing the application server(s). For example, module 208 may make one or more network connections to an application server identified in configuration data by IP address, port, server web root, and/or other information identified when an extension is loaded. Additionally or alternatively, module 208 may coordinate with an instance of an application server at the same computing device, but separate from the IDE (e.g., if the application server is "localhost").

Figure 3:
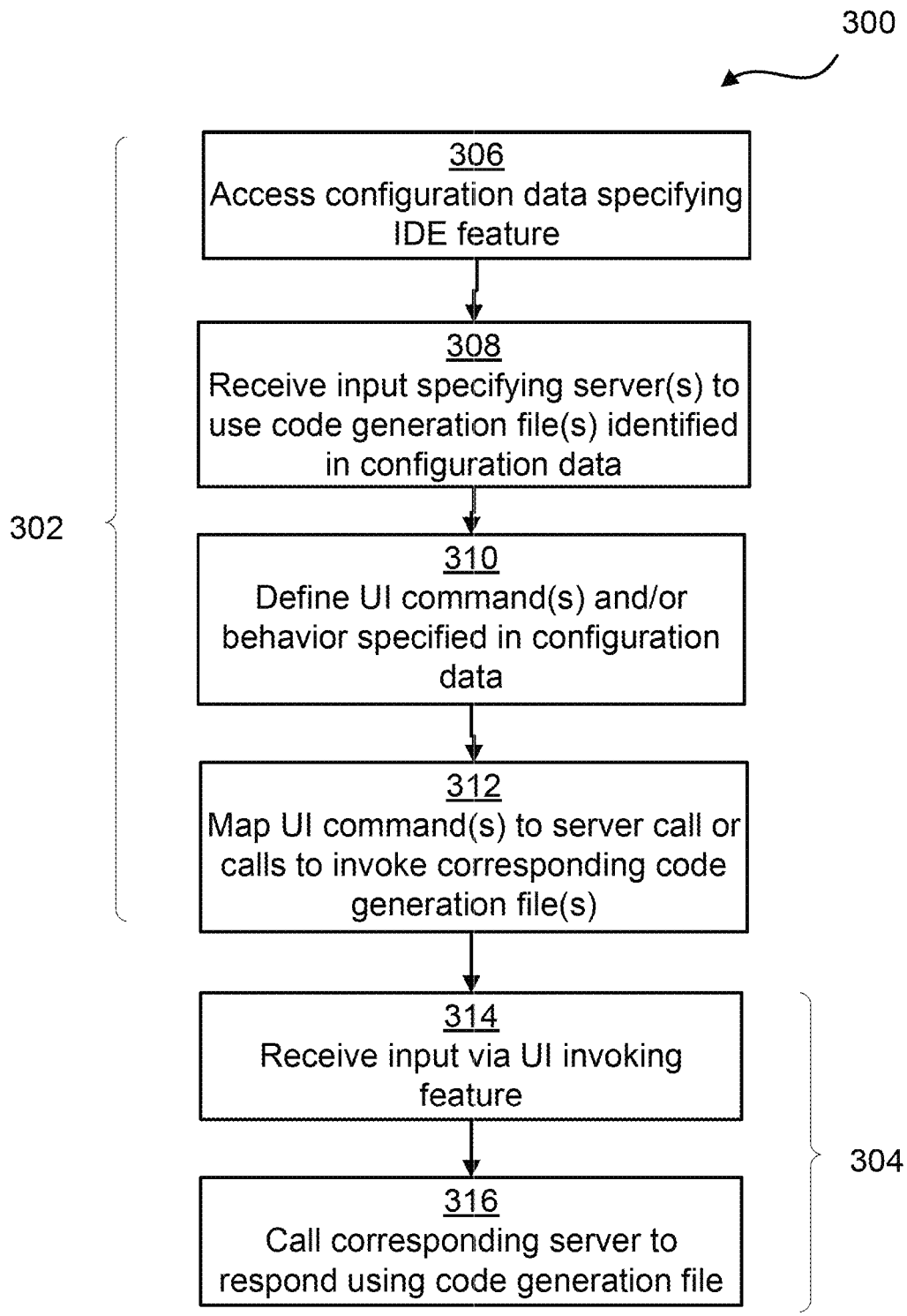
FIG. 3 is a flowchart showing steps in an exemplary method of customizing and IDE based on server-side code.

FIG. 3 is a flowchart showing steps in an exemplary method 300 of customizing an IDE based on server-side code. In this example, method 300 includes a flow 302 for customizing an IDE with one or more extensions and a flow 304 for using the extension(s). Flows 302 and 304 may be carried out in sequence or separately from one another (e.g., flow 304 may be invoked some time after a particular IDE has an extension installed).

Block 306 represents accessing configuration data specifying functionality to be added to an integrated development environment (IDE) executing at a client device, the configuration data identifying a code generation file to invoke by providing a call to an application server. As was noted above, an extension may comprise one or more XML files with configuration data specified in terms of events and event handlers.

Block 308 represents receiving input specifying one or more servers which are to use code generation files identified in the configuration data. For example, IDE 118 may provide a dialog box in which a user can specify the server name, directory path/location information, port number, and file location.

In some embodiments, blocks 306 and 308 occur in response to a selection of an extension package to install. For instance, XML or other configuration files may be packaged in an archive (e.g., a ZIP file) together with one or more code generation files. IDE 118 may be configured to open the archive, copy the configuration data, and then request path information for use in uploading the code generation files and then accessing the code generation files in accordance with the configuration data.

Block 310 represents defining a user interface (UI) element to be provided by the IDE for invoking the functionality. For instance, a contextual menu may be defined as an event generator. As another example, buttons, drop-down menus, dialog boxes, and/or other types of interface elements may be supported. Block 312 represents mapping the UI element to an IDE component so that, when the UI element is utilized, the IDE component provides a call to the application server to invoke the code generation file and provide the specified functionality. For example, the IDE can include an event monitor that is configured to listen to the identified events and provide an indicator of an event to a handler that sends a suitable request to the application server.

Flow 304 represents invoking the UI feature. In this example, the UI feature is triggered by the receipt of user input via the UI element as noted at block 314. At block 316, a call is provided to the server(s) corresponding to the desired function using the appropriate code generation file or files. Although in this example an input event triggers the server call, other events could be used as well. For example, the IDE may provide events when a new file is created, a new project created or when the IDE is loaded. In such an embodiment, extensions could be then be added for generating a coding framework in response to creation of a new file to help expedite the coding process. As further examples, events may be triggered when existing files are modified, deleted, or saved to automate coding tasks associated with such changes. Additionally, calls to multiple different servers or multiple code generation files at the same server may be specified by configuration data.

In some embodiments, processing of the triggering event involves gathering information related to the event. For example, a contextual menu may be triggered from within a particular view of the IDE, such as in a particular panel, in a selected node in a tree of files/other resources, and/or at another known point in the IDE or file structure of the project under development in the IDE. The configuration data may specify information to be collected for use by the extension. For instance, a command to be invoked from within a node corresponding to a database table may collect the table name, column names, data types, etc. The corresponding handler for the menu item can be identified from a handler ID which, as was noted above, is mapped to a code generation file such as a server template.

Using the server information included when the extension was installed, a suitable request can be created by the IDE. For example, the application server may be configured to respond to HTTP requests. Accordingly, the IDE can provide an HTTP post request to the server, with the HTTP request including one or more parameters in a suitable format. For example, the event information that was gathered may be packaged in an XML format as a FORM variable.

Figure 4:
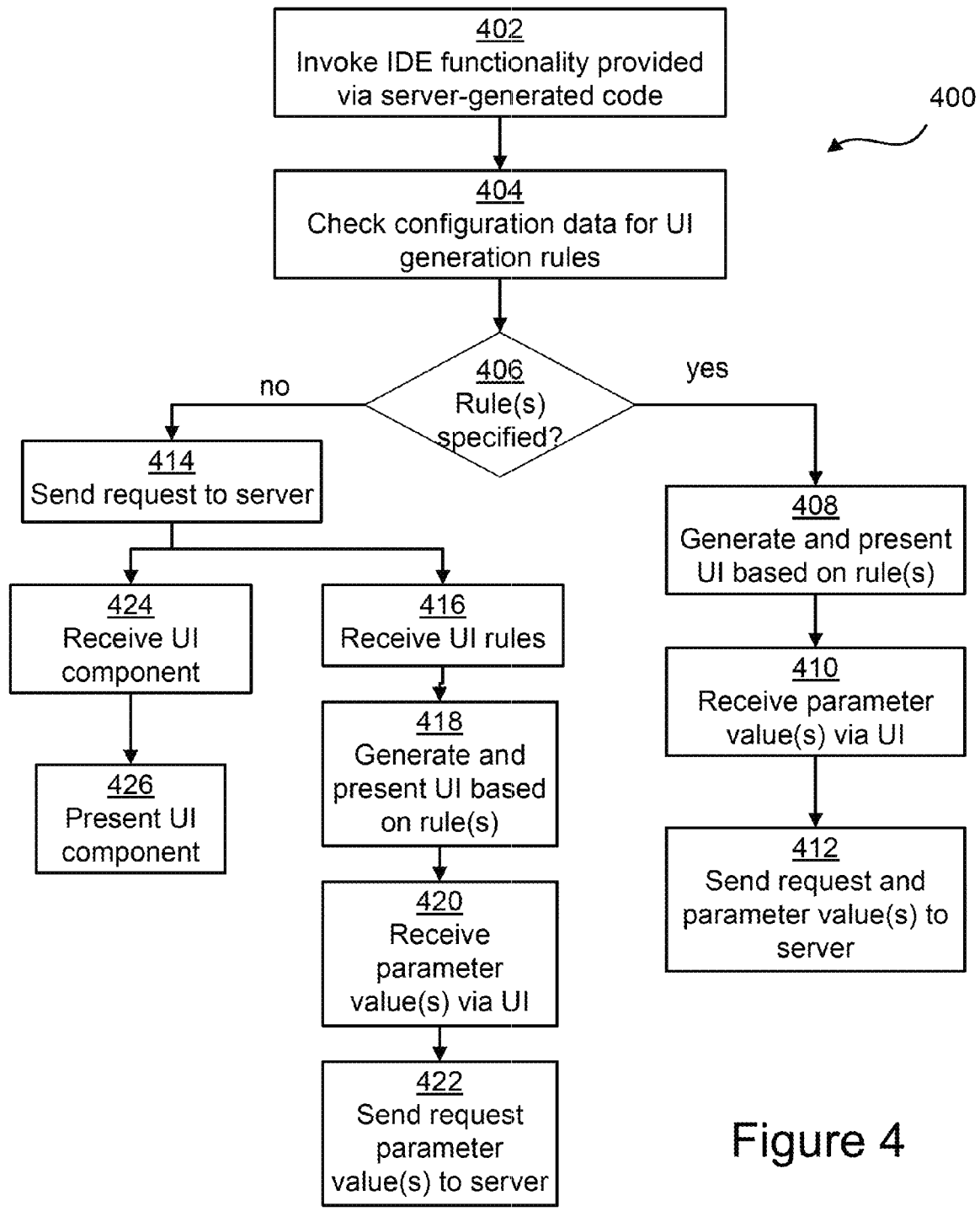
FIG. 4 is a flowchart showing steps in an exemplary method of invoking server-side code from an IDE.

FIG. 4 is a flowchart showing steps in an exemplary method 400 of invoking server-side code from an IDE. As was noted above, an IDE can be configured to support dynamic UI functionality for use in passing and/or receiving one or more parameters from server-executed code generation files. Blocks 402 and 404 represent invoking IDE functionality provided by calls to server-generated code and checking the configuration data for UI generation rules.

In some embodiments, the configuration data can comprise one or more rules for generating UI components. For example, an XML file specifying a first UI element for invoking a function may also specify a second UI element for generating an interface to receive one or more parameters to pass when invoking the function. As an example, the UI rules may indicate an interface element type (e.g., text field, password field, controls to select a directory, project, or files, checkboxes, drop-down lists, and the like), along with information mapping the elements to parameter names.

If one or more rules are identified at block 406, flow moves to block 408 at which the UI element(s) are generated based on the rules. At block 410, one or more parameter values are received, and then at block 412 a request along with the parameter values is sent to the server to invoke suitable code generation files.

In some embodiments, no UI rules are included in the specification data. Instead, the application server may provide UI rules in response to the request and/or may generate UI components itself. Block 414 represents sending a request to the application server to invoke the code generation file(s). For instance, an HTTP request can be sent with no parameters or only comprising automatically-collected event parameters.

Blocks 416-422 represent an example of generating UI components by the IDE in response to data identifying a second UI element. At block 416, the IDE receives UI rules from the server. The rules may, for example, specify interface element types and variable names. At block 418, the IDE generates and presents a user interface based on the rules and receives one or more parameter values at block 420. At block 422, an updated request is sent to the application server with the parameter values. The received rules may specify a syntax for returning the requested parameters.

Blocks 424 and 426 represent presenting a UI component generated by the application server. For example, the application server may generate an HTML page, rich internet application, and/or another UI component to directly receive one or more parameters. In that case, the IDE can simply provide a suitable interface for providing the component to a user of the IDE. For example, the IDE may include a browser for rendering HTML pages and/or may invoke a plug-in for executing a rich internet application. As another example, the IDE may open a browser or another application that displays the UI component generated by the application server.

In this example, a single iteration of parameter passing is shown. However, depending upon the server-side code generation files, several interfaces may be displayed to a user. For instance, an initial set of parameters may be sent based on UI rules included in the configuration data. The configuration data may include another set of UI rules for generating a follow-up interface in response to an acknowledgement by the application server. As another example, once the application server has received an initial set of parameters, the application server may supply a set of UI rules and/or generate UI components for receiving follow-up information.

The application server can provide code or other output for use by the IDE or storage as directed by the user via input and/or as directed by the configuration file. For example, if a code generation template is used, the application server can return generated code which is then inserted at a selected point in the IDE. As an example, the user may invoke the template from a code entry area. When the server-side code is invoked, the IDE can track the current point in the code entry area and when the server-generated code is returned, the code can be inserted. As another example, the user may be prompted for a location to which a complete code file or fragments of code are to be stored (e.g., a directory or server location). Ultimately, the generated code may be accessible by or may be inaccessible by the IDE depending on user input and/or what is specified in the configuration file.

Figure 5:
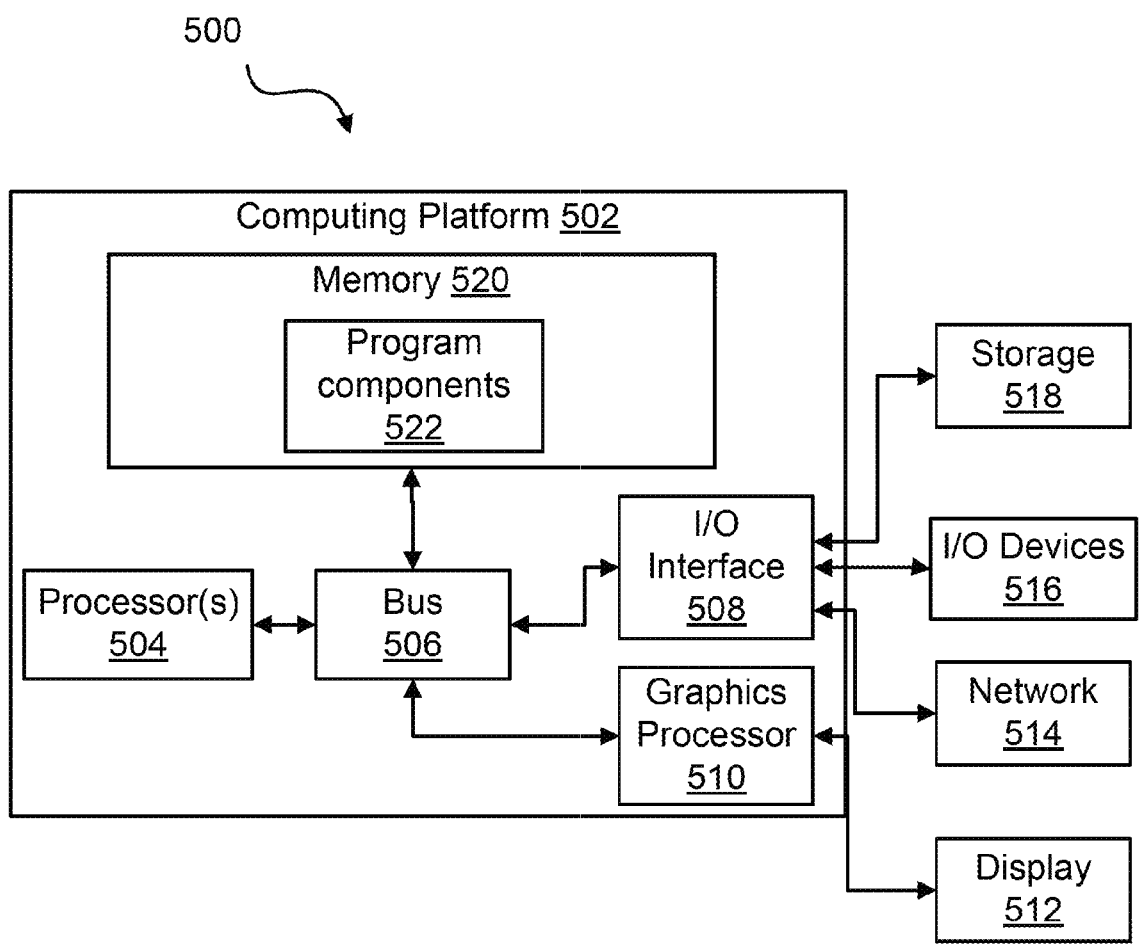
FIG. 5 is a block diagram illustrating an exemplary computing system suitable for use in implementing one or more embodiments of the present subject matter.

FIG. 5 is a block diagram illustrating an exemplary computing system 500 suitable for use in implementing one or more embodiments of the present subject matter. In this example, computing system 500 includes a computing device 502 comprising one or more processors 504, a bus 506, memory 520, input-output (I/O) handling components 508, a graphics processor 510, a display 512, user input (UI) devices 516 (e.g., a mouse, keyboard, touch screen interface, etc.), one or more networking or other interfaces 514 (e.g., Ethernet, USB, etc.), and storage 518 (e.g., hard disk, optical drive(s)). Memory 520 represents one or more computer-readable media accessible by processor(s) 504 and can embody one or more program components 522 that configure the operation of the computing system.

For example, computing system 500 can be configured with an IDE such as IDE 118 as shown in FIGS. 1-2 to provide a developer client system. As another example, computing system 500 can be configured with an application server program such as application server 110 and/or a browser or other end use.

Figure 6:
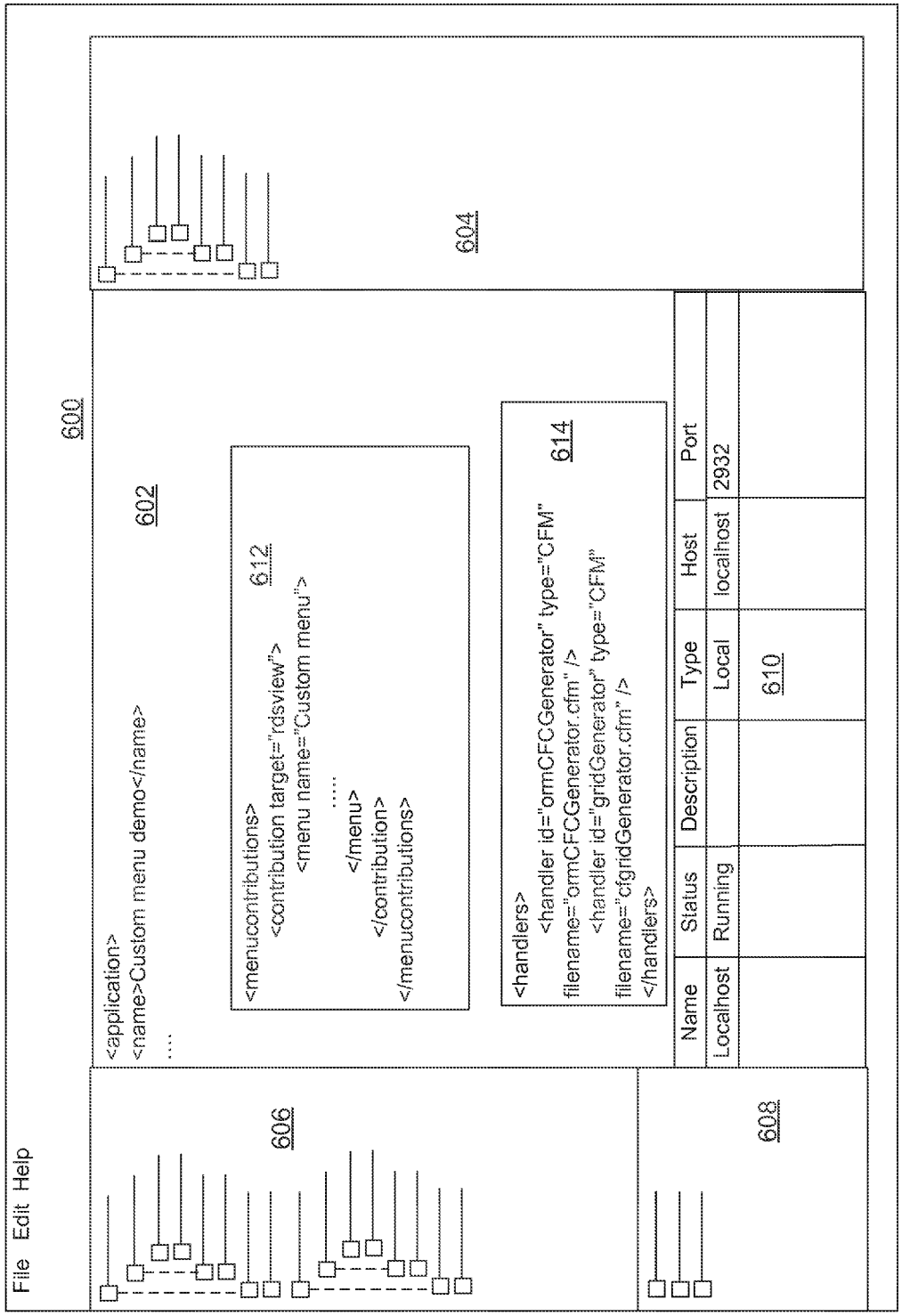
FIG. 6 is a diagram illustrating an exemplary user interface for an IDE.

FIG. 6 is a diagram illustrating an exemplary user interface 600 in an IDE. In this example, the IDE includes a menu bar with File, Edit, Help, and other commands and a plurality of panels 602, 604, 608, and 610. Code entry panel 602 allows a user to type or otherwise input code. Data view panel 604 allows a user to browse and select various datasets; for example, datasets may be mapped to data accessible by an application server known to the IDE. Navigator panel 606 allows easy navigation to various projects and project directories. File panel 608 allows a user to browse local and remote file locations, while server panel 610 allows a user to specify and connect to one or more servers. In this example, an application server "localhost" is connect, although a remote server could of course be used.

Code entry panel 602 presently displays an example of a configuration file in XML format. In this example, a plurality of custom menu options are added via the code specified at 612 and corresponding event handlers are specified at 614. For instance, this example provides a menu called "Custom Menu" triggered from the target "rdsview," which can correspond to a particular menu or view to which the "Custom Menu" is to be added. Each action item in the custom menu corresponds to a handler id. For example, "menu item 1" corresponds to a handler id "ormCFCGenerator."

Handlers 614 are used to map the menu commands to code generation files. In this example, the handler "ormCFCGenerator" indicates a type "CFM" and a code generation file name "ormCFCGenerator.cfm." Thus, when "menu item 1" is triggered, the file ormCFCGenerator.cfm" will be invoked by a call to the appropriate server.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result.

In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method for providing code generation in an integrated development environment (IDE) used to develop code as part of a project managed via the IDE at a client device, the method comprising:
    implementing an extension to the IDE comprising: (i) configuration data to add functionality to the IDE without recompiling the IDE, the configuration data identifying an event, (ii) a code generation file to invoke at an application server in response to the identified event to generate the code, and (iii) specification of one or more parameters to be received by the IDE and provided to the application server to use in generating the code;
    determining whether one or more user interface (UI) generation rules are specified by the configuration data;
    responsive to a determination that the one or more UI generation rules are specified, providing a UI element at the IDE for invoking the functionality based on the configuration data, the UI element comprises a contextual menu and the functionality comprises a server template selectable from a plurality of server templates identified in the contextual menu;
    monitoring the IDE to determine if the event occurs, wherein input received via the UI element corresponds to the event that triggers providing a call to the application server and monitoring the IDE comprises listening to a plurality of events;
    upon occurrence of the event, providing the call to the application server with the one or more parameters to invoke the code generation file, the code generation file invoked to configure the application server to use the one or more parameters to provide the generated code to the IDE for insertion into the project managed via the IDE, wherein the code generation file is implemented in a programming language that is different than the programming language used to implement the IDE; and
    receiving the generated code from the application server and inserting the generated code into the project managed via the IDE.

2. The method set forth in claim 1, further comprising:
    storing the generated code as part of the project managed via the IDE.

3. The method set forth in claim 1, further comprising receiving a parameter to pass to the application server, and wherein providing the call to the application server comprises generating a Hypertext Transfer Protocol (HTTP) post request to the application server, the HTTP post request including a form variable comprising an Extensible Markup Language (XML)-formatted set of information comprising the parameter.

4. The method set forth in claim 1, further comprising:
    accessing the configuration data to identify a second UI element;
    presenting an interface based on the second UI element;
    receiving a parameter via the interface; and
    providing the parameter to the application server.

5. The method set forth in claim 1, further comprising:
    presenting a second UI element generated by the application server.

6. The method set forth in claim 1, further comprising:
    receiving data identifying a second UI element from the application server in response to the call to invoke the code generation file;
    presenting an interface based on the data identifying the second UI element;
    receiving a parameter via the interface; and
    providing the parameter to the application server.

7. The method set forth in claim 6, wherein the second UI element comprises a dialog box.

8. The method set forth in claim 6, wherein the second UI element comprises a Hypertext Mark-up Language (HTML) page presented via a browser included in the IDE.

9. The method set forth in claim 1, further comprising:
    transmitting, when determined that the one or more UI generation rules are not specified by the configuration data, a request to the application server;

receiving the one or more UI generation rules in response to the request;

providing a UI element at the IDE for invoking the functionality based on the one or more UI generation rules received; and transmitting a second call to the application server comprising input received via the UI element.

10. The method set forth in claim 1, further comprising:

responsive to a determination that one or more UI generation rules are not specified by the configuration data, transmitting a request to the application server;

receiving a UI component from the application server in response to the request; and providing the UI component for display on the client device.

11. A computing system comprising a processor with access to a computer-readable medium embodying program components for providing custom code generation in an integrated development environment (IDE) used to develop code as part of a project managed via the IDE in the computing system, the program components comprising:

a user interface module that configures the computing system to provide a user interface (UI) for receiving input and providing output from the IDE;

a computing interface module that configures the computing system to maintain a connection to an application server identified in configuration data;

a dynamic UI module that determines whether one or more UI generation rules are specified by the configuration data, and responsive to a determination that the one or more UI generation rules are specified, provides a UI element in the user interface to invoke a function based on the configuration data, wherein the UI element comprises a contextual menu and the function comprises a server template selectable from a plurality of server templates identified in the contextual menu; and an IDE extension manager that configures the computing system to:

implement an extension to the IDE comprising: (i) the configuration data to add the function to the IDE without recompiling the IDE, the configuration data identifying the event, (ii) a code generation file to invoke at the application server in response to the identified event to generate the code, and (iii) specification of one or more parameters to be received by the IDE and provided to the application server for use with the code generation file to generate the code;

monitor the IDE to determine if the event specified in the configuration data occurs, wherein input received via the UI element corresponds to the event that triggers providing a call to the application server and monitoring the IDE comprises listening to a plurality of events;

provide the call to the application server with the one or more parameters to invoke the code generation file if the event occurs, the code generation file invoked to configure the application server to use the one or more parameters to provide the generated code to the IDE for insertion into the project managed via the IDE, wherein the code generation file is implemented in a programming language that is different than the programming language used to implement the IDE; and receive the generated code from the application server and insert the generated code into the project managed via the IDE.

12. The computing system set forth in claim 11, wherein the dynamic UI module further configures the computing system to present a second UI element generated by the application server in response to invoking the code generation file.

13. The computing system set forth in claim 11, wherein the UI element in the UI is configured to receive at least one of the one or more parameters to pass to the application server.

14. The computing system set forth in claim 11, wherein providing the call to the application server comprises generating a Hypertext Transfer Protocol (HTTP) post request to the application server, the HTTP post request comprising Extensible Markup Language (XML)-formatted set of information comprising at least one of the one or more parameters to pass to the application server.

15. A computer program product comprising a tangible, non-transitory computer readable medium embodying instructions for providing code generation in an integrated development environment (IDE) used to develop code as part of a project managed via the IDE at a client device, the instructions, when executed by the client device, causes the client device to:

implement an extension to the IDE comprising: (i) configuration data to add functionality to the IDE without recompiling the IDE, the configuration data identifying an event, (ii) a code generation file to invoke at an application server in response to the identified event to generate code, and (iii) specification of one or more parameters to be received by the IDE and provided to the application server to use in generating the code;

determine whether one or more user interface (UI) generation rules are specified by the configuration data;

responsive to a determination that the one or more UI generation rules are specified, provide a UI element at the IDE for invoking the functionality based on the configuration data, the UI element comprises a contextual menu and the functionality comprises a server template selectable from a plurality of server templates identified in the contextual menu;

monitor the IDE to determine if the event occurs, wherein input received via the UI element corresponds to the event that triggers providing a call to the application server and monitoring the IDE comprises listening to a plurality of events;

upon occurrence of the event, provide the call to the application server with the one or more parameters to invoke the code generation file, the code generation file invoked to configure the application server to use the one or more parameters to provide the generated code to the IDE for insertion into the project managed via the IDE, wherein the code generation file is implemented in a programming language that is different than the programming language used to implement the IDE; and receive the generated code from the application server and insert the generated code into the project managed via the IDE.

* * * * *